(12) United States Patent
Wyss

(10) Patent No.: US 10,288,813 B2
(45) Date of Patent: May 14, 2019

(54) CONSTRUCTION OF INTEGRATED MODE TRANSFORMERS

(71) Applicant: Mellanox Technologies Silicon Photonics Inc., Monterey Park, CA (US)

(72) Inventor: Rolf Andreas Wyss, Glendale, CA (US)

(73) Assignee: Mellanox Technologies Silicon Photonics Inc., Monterey Park, CA (US)

( * ) Notice: Subject to any disclaimer, the term of this patent is extended or adjusted under 35 U.S.C. 154(b) by 0 days.

(21) Appl. No.: 15/585,705

(22) Filed: May 3, 2017

(65) Prior Publication Data

US 2018/0321444 A1 Nov. 8, 2018

(51) Int. Cl.
*G02B 6/30* (2006.01)
*G02B 6/14* (2006.01)
*G02B 6/122* (2006.01)
*G02B 6/12* (2006.01)

(52) U.S. Cl.
CPC ............. *G02B 6/305* (2013.01); *G02B 6/122* (2013.01); *G02B 6/14* (2013.01); *G02B 2006/12097* (2013.01); *G02B 2006/12135* (2013.01)

(58) Field of Classification Search
CPC .......... G02B 6/305; G02B 6/122; G02B 6/14; G02B 2006/12097; G02B 2006/12135
USPC ........................................................ 385/28
See application file for complete search history.

(56) References Cited

U.S. PATENT DOCUMENTS

2015/0316720 A1* 11/2015 Yang ...................... G02B 6/305
                                                                    385/14
2016/0131837 A1* 5/2016 Mahgerefteh ........ G02B 6/1228
                                                                    385/14
2017/0254951 A1* 9/2017 Dumais ................ G02B 6/1228

* cited by examiner

*Primary Examiner* — Jerry M Blevins
(74) *Attorney, Agent, or Firm* — Gavrilovich, Dodd & Lindsey, LLP

(57) ABSTRACT

A platform taper is formed in an optical chip. A light-transmitting medium is attached to the optical chip after forming the platform taper in the optical chip. A waveguide taper is formed in the light-transmitting medium such that the waveguide taper and the platform taper are aligned so as to form an optical taper on the optical device.

19 Claims, 12 Drawing Sheets

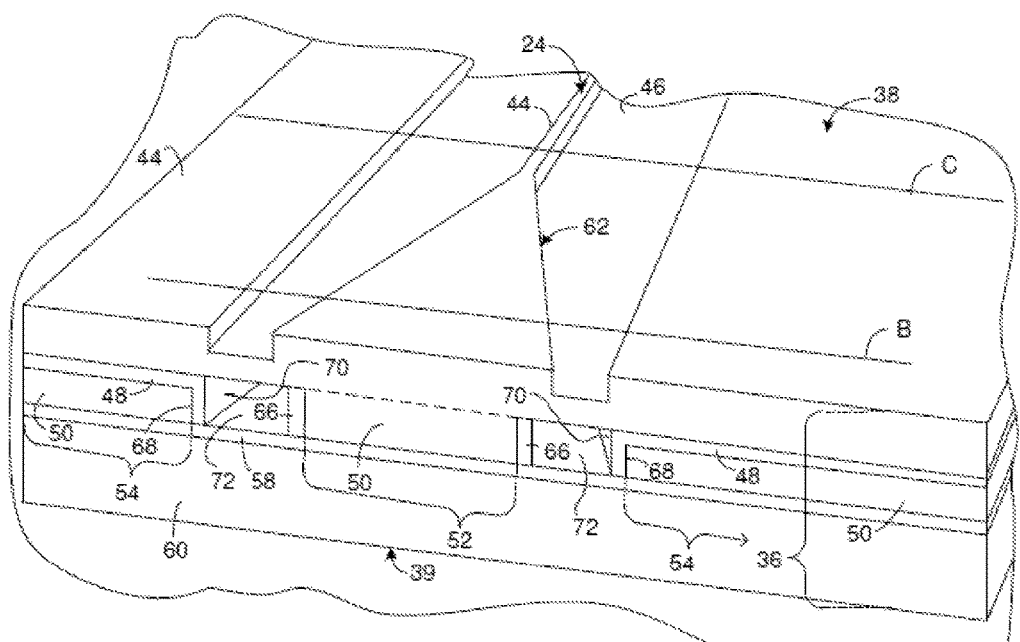
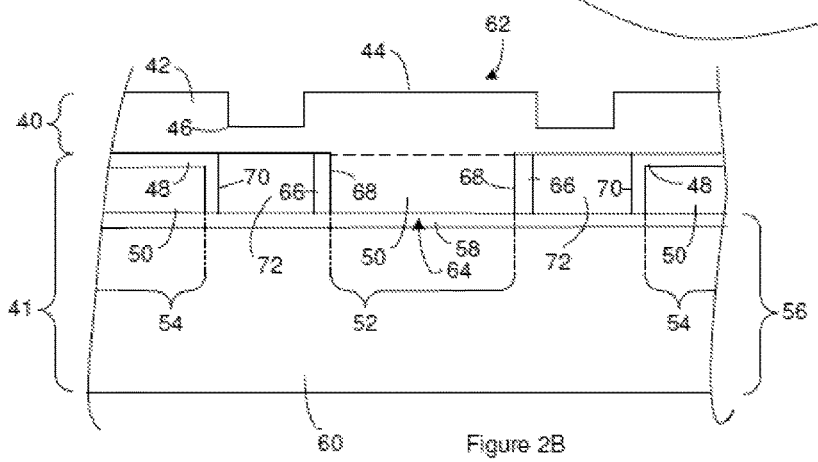
Figure 2A
Figure 2B

CONSTRUCTION OF INTEGRATED MODE TRANSFORMERS

RELATED APPLICATIONS

This patent application is related to U.S. patent application Ser. No. 15/382,481, filed on Dec. 16, 2016, entitled "Construction of Integrated Mode Transformers" and incorporated herein in its entirety.

FIELD

The present invention relates to optical devices and more particularly to optical devices that include a mode transformer.

BACKGROUND

A variety of optical devices have one or more waveguides positioned on base. The waveguides often guide light signals to other optical components such as modulators, switches, demultiplexers, and light sensors. These waveguides often receive the light signals from an external device and/or guide the light signals to the external optical device. Accordingly, the light signals are often transferred between a waveguide on the optical device and an external optical device such as an optical fiber.

The mode size for the waveguide is often different than mode size of the external optical device. For instance, the mode size of waveguides on planar optical devices is often smaller than the mode size of the optical fibers with which the planar optical device exchanges light signals. The difference in mode size is a source of optical loss that may limit device performance. In order to address this issue, a taper is often added to the waveguide that exchanges light signals with the second optical device. For instance, the waveguide on a planar optical device can be tapered such that the mode size of a light signal carried in the waveguide expands to the mode size of the optical fiber with which the waveguide will exchange light signals.

Fabrication of a tapered waveguide on an optical device can interfere with fabrication of the other components on the same optical device. The fabrication challenges become even more evident when the taper is both vertical and horizontal. As a result, there is need for a system that permits the exchange of light signals between different optical devices without complicating the fabrication process.

SUMMARY

A method of forming an optical device includes forming a platform taper on an optical chip. A light-transmitting medium is attached to the optical chip after forming the platform taper in the optical chip. A waveguide taper is formed in the light-transmitting medium such that the waveguide taper and the platform taper are aligned so as to form an optical taper on the optical device.

An optical device includes a waveguide layer on a base. The waveguide layer includes a waveguide taper optically aligned with a waveguide. The waveguide taper including a light-transmitting medium. A platform taper is between the waveguide taper and the base. The platform taper also includes the same light-transmitting medium. A bond between the light-transmitting medium included in the waveguide taper being and the light-transmitting medium included in the platform taper providing an interface where a lattice of the light-transmitting medium in the waveguide taper is not continuous with a lattice of the light-transmitting medium in the platform taper.

BRIEF DESCRIPTION OF THE FIGURES

FIG. 2A through FIG. 2D illustrate an optical device that is suitable for use as an optical device in the system of FIG. 1.

FIG. 2A is a perspective view of the optical device.

FIG. 2B is a cross section of the optical device shown in FIG. 2A taken along the line labeled B in FIG. 2A.

FIG. 2C is a cross section of the optical device shown in FIG. 2A taken along the line labeled C in FIG. 2A.

FIG. 2D is a perspective view of the optical device shown in FIG. 2A but with a portion of the device treated as transparent so the relationship between underlying features is visible.

FIG. 3A is a perspective view of a device precursor upon which a first mask has been patterned.

FIG. 3B is a perspective view of the device precursor of FIG. 3A after performing an etch followed by removal of a portion of the first mask.

FIG. 3C is a perspective view of the device precursor of FIG. 3B after oxide is formed on the portions of a component medium that are not protected by the remaining portions of the first mask.

FIG. 3D is a perspective view of the device precursor of FIG. 3C after removal of the remaining portions of the first mask.

FIG. 3E is a perspective view of a waveguide layer precursor.

FIG. 3F is a perspective view of a device precursor that includes the waveguide layer precursor of FIG. 3E bonded to the device precursor of FIG. 3D.

FIG. 3G is a perspective view of the device precursor of FIG. 3F after a portion of the waveguide layer precursor is removed so as to leave a waveguide layer on the device precursor.

FIG. 3H is a perspective view of the device precursor of FIG. 3G after a second mask is patterned on the device precursor of FIG. 3G.

FIG. 3I is a perspective view of the device precursor of FIG. 3I after the device precursor is etched and the second mask is removed.

FIG. 6C is a perspective view of the device.

FIG. 6D is a cross section of the device shown in FIG. 6C taken along the line labeled D in FIG. 6C.

DESCRIPTION

A system includes an optical device in optical communication with an external device such as an optical fiber. The optical device includes a taper and a waveguide on a base. The taper is positioned such that the waveguide and the external device exchange light signals through the taper. The taper changes the size and/or shape of the one or more light signal modes as the light signals travel through the taper.

The taper can be formed by forming a platform taper in a component medium located on the top of a wafer or chip. A waveguide layer can be bonded over the component medium. An upper surface of the waveguide layer can be smooth and continuous. As a result, the waveguide layer is suitable for partially or completely forming one or more optical components on the optical device. For instance, a waveguide taper can be formed in the waveguide layer. The waveguide taper can be aligned with the platform taper so the waveguide taper and the platform taper combine to form the taper on the optical device. The taper can be sized for proper alignment with an optical fiber.

A waveguide can be concurrently formed in the waveguide layer with the waveguide taper. The waveguide can be butt-coupled and integrated with the waveguide taper. Additionally, the waveguide layer can include, consist of, or consist essentially of a light-transmitting medium. The waveguide and the waveguide taper can be formed in the light-transmitting medium. As a result, there need not be any facets at the interface between the waveguide taper and the waveguide providing an efficient transition between the taper and the waveguide. Additionally, forming a taper as described above can avoid the expense and increased complexity that is normally associated with deposition and/or epitaxial growth of materials. Accordingly, the taper can be associated with high efficiency and simplified fabrication.

Figure 1:
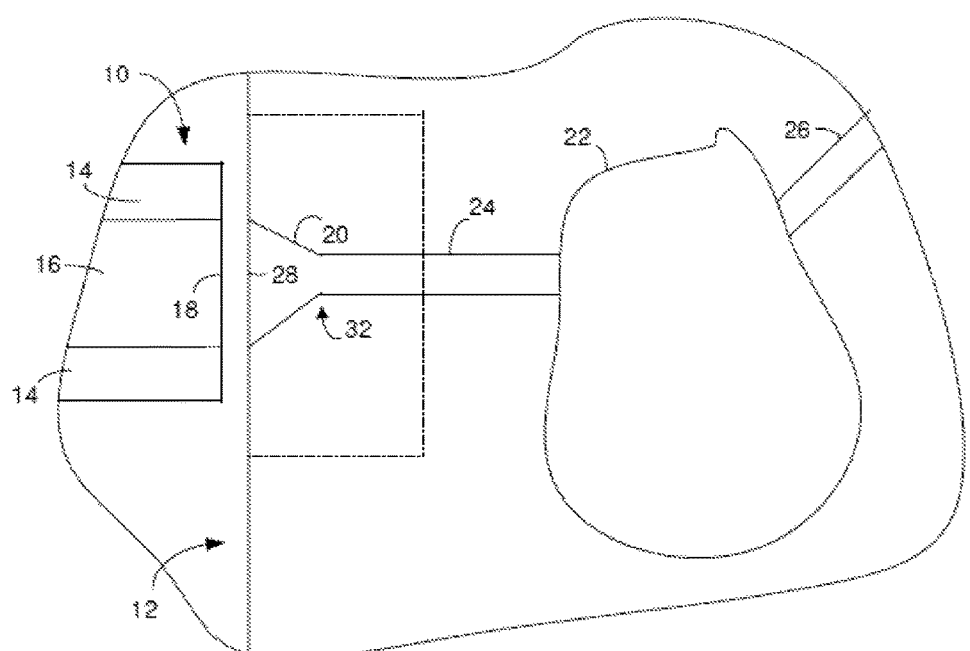
FIG. 1 is a perspective view of a system that includes an optical fiber in communication with an optical device.

FIG. 1 illustrates a system that includes an optical fiber 10 in communication with an optical device 12. In FIG. 1, a cross section of the optical fiber 10 is shown and a topview of the optical device 12 is shown. The optical fiber 10 includes a cladding 14 on a core 16. The core 16 includes a fiber facet 18 through which light signals exit and/or enter the optical fiber 10.

The illustrated portion of the optical device 12 includes a taper 20, an optical component 22, a waveguide 24 and a secondary waveguide 26. The taper 20 includes a taper facet 28. The dimensions of the taper facet 28 can be single mode or multimode. The waveguide 24 guides light signals between the taper 20 and the optical component 22. The light signals travel through the taper 20 when traveling between the optical fiber 10 and the waveguide 24. The taper 20 can change the size and/or shape of the one or more optical modes of the light signals as they travel though the taper 20. For instance, when the light signals travel from the optical fiber 10 to the optical device 12, the taper 20 can reduce the size and/or shape of the light signal to a size and/or shape that is suitable for the smaller dimensions of the waveguide 24. In some instances, the taper 20 acts as a mode transformer. In some instances, the taper 20 can be configured as an adiabatic mode transformer.

The secondary waveguide 26 is optional and can carry light signals to and/or from the optical component 22.

Examples of optical components 22 that can be included on the optical device 12 include, but are not limited to, one or more components selected from a group consisting of facets through which light signals can enter and/or exit a waveguide, entry/exit ports through which light signals can enter and/or exit a waveguide from above or below the optical device 12, multiplexers for combining multiple light signals onto a single waveguide, demultiplexers for separating multiple light signals such that different light signals are received on different waveguides, optical couplers, optical switches, lasers that act a source of a light signal, amplifiers for amplifying the intensity of a light signal, attenuators for attenuating the intensity of a light signal, modulators for modulating a signal onto a light signal, modulators that convert a light signal to an electrical signal, and vias that provide an optical pathway for a light signal traveling through the optical device 12 from the bottom side of the optical device 12 to the top side of the optical device 12. Additionally, the optical device 12 can optionally include electrical components. For instance, the optical device 12 can include electrical connections for applying a potential or current to a waveguide and/or for controlling other components on the optical device 12.

Figure 2C:
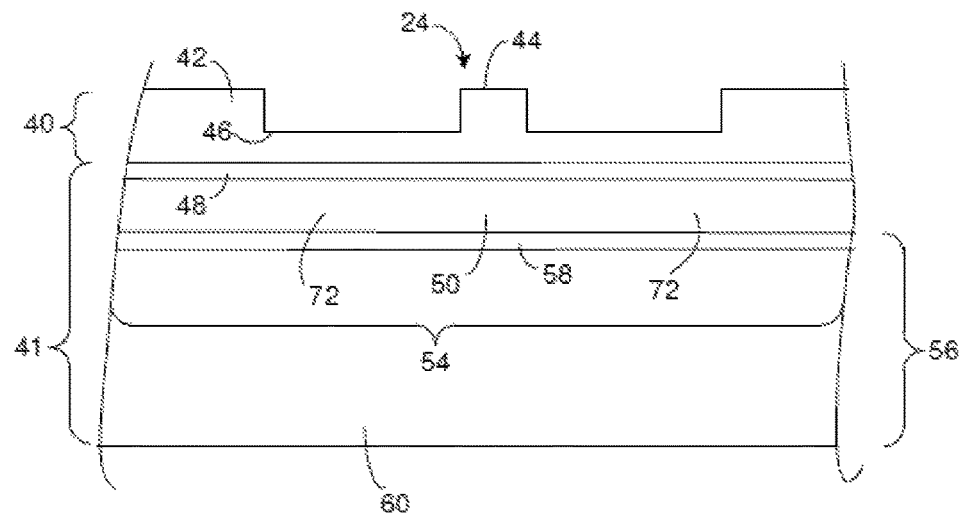
Figure 2D:
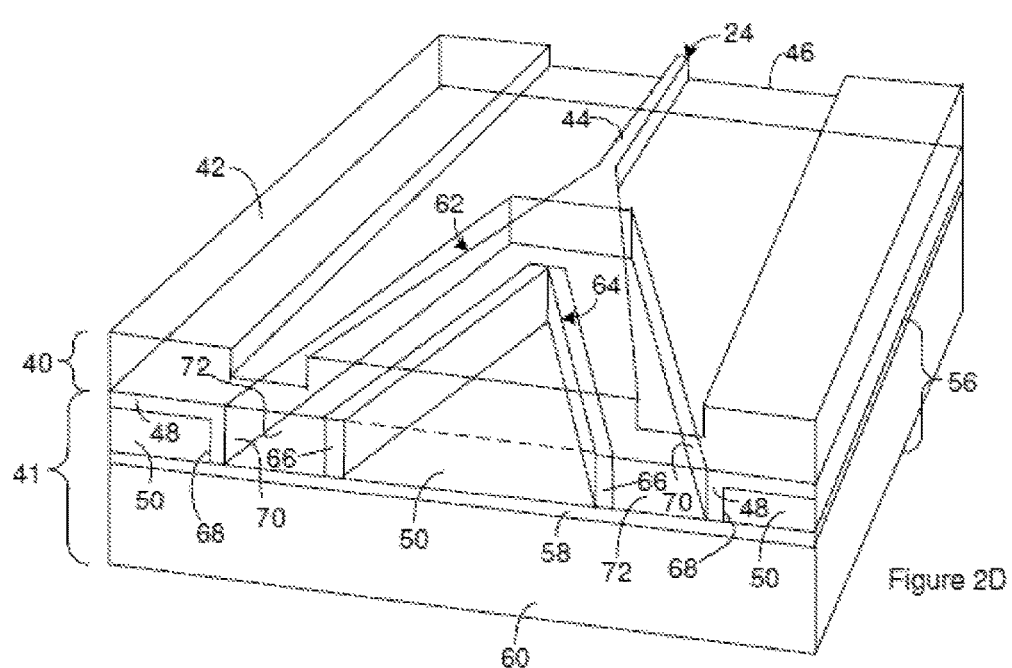

FIG. 2A through FIG. 2D illustrate an optical device that is suitable for use as an optical device 12 in the system of FIG. 1. FIG. 2A is a perspective view of the optical device. FIG. 2B is a cross section of the optical device shown in FIG. 2A taken along the line labeled B in FIG. 2A. FIG. 2C is a cross section of the optical device shown in FIG. 2A taken along the line labeled C in FIG. 2A. FIG. 2D is the perspective view of the optical device shown in FIG. 2A but with a portion of the device treated as transparent so the relationship between underlying features is visible.

The optical device is within the class of optical devices known as planar optical devices. Planar optical devices typically include one or more waveguides immobilized relative to a substrate or a base. The direction of propagation of light signals along the waveguides is generally parallel to a horizontal plane of the optical device. Examples of a horizontal plane of the optical device include the topside of the base, the bottom side of the base, the topside of the substrate, and/or the bottom side of the substrate.

The illustrated optical device includes lateral sides 36 (or edges) extending from a topside 38 to a bottom side 39. The propagation direction of light signals along the length of the waveguides on a planar optical device generally extends through the lateral sides 36 of the optical device. The topside 38 and the bottom side 39 of the optical device are non-lateral sides.

The optical device includes a waveguide layer 40 on a device platform 41. In FIG. 2D, the waveguide layer 40 is treated as transparent in order to show the underlying parts of the device. The device platform 41 is a platform upon which planar optical devices are typically built. Examples of device platforms 41 include, but are not limited to, optical chips and optical wafers such as silicon-on-insulator wafers, and silicon-on-insulator chips. Since multiple optical devices are typically built on a single wafer and the separated from one another, the device platform 41 can be a chip or a portion of a wafer.

The waveguide layer 40 includes or consists of a light-transmitting medium 42. The waveguide layer 40 includes a waveguide 24 that is configured to guide light signals through the light-transmitting medium 42. Accordingly, the light-transmitting medium 42 can serve as the waveguide material. A portion of the waveguide 24 is partially defined by a ridge 44 extending upward from a slab region of the light-transmitting medium 42 as is most evident in FIG. 2C. In some instances, the top of the slab region is defined by the bottom of trenches 46 extending partially into the light-transmitting medium 42 or through the light-transmitting medium 42. Suitable light-transmitting media include, but are not limited to, silicon, polymers, silica, SiN, GaAs, InP and LiNbO$_3$. One or more cladding layers (not shown) are optionally positioned on the light-transmitting medium 42. The one or more cladding layers can serve as a cladding for the waveguide and/or for the optical device. When the light-transmitting medium 42 is silicon, suitable cladding layers include, but are not limited to, silicon, polymers, silica, SiN, GaAs, InP and LiNbO$_3$.

The portion of the device platform 41 adjacent to the light-transmitting medium 42 can act as a cladding for the waveguide 24. For instance, a portion of the device platform 41 can be contact with the bottom of the light-transmitting medium 42 and can be configured to reflect light signals from the waveguide 24 back into the waveguide 24 in order to constrain light signals in the waveguide 24. For instance, the portion of the device platform 41 adjacent to the light-transmitting medium 42 can be an optical insulator 48 with a lower index of refraction than the light-transmitting medium 42. The drop in the index of refraction can cause reflection of a light signal from the light-transmitting medium 42 back into the light-transmitting medium 42.

The device platform 41 can include the optical insulator 48 positioned on at least a portion of a component medium 50. During operation of the device, light signals are carried and/or guided through an active portion 52 of the component medium 50. For instance, an active portion 52 of the component medium 50 is tapered and light signal are carried or guided through the tapered portion of the component medium 50 during operation of the device. In some instances, the component medium 50 includes one or more inactive portions 54 through which light signals are not carried or guided during operation of the device. The optical insulator 48 is between the inactive portions 54 of the component medium 50 and the light-transmitting medium 42 but not between the active portions 52 of the component medium 50 and the light-transmitting medium 42. The inactive portions 54 of the component medium 50 and the optical insulator 48 can provide support to the waveguide layer 40.

The component medium 50 is positioned on a base 56. The base 56 can include a second optical insulator 58 positioned on a substrate 60. In one example, the device platform 41 is constructed on a silicon-on-insulator wafer. A silicon-on-insulator wafer includes a silicon layer that serves as the component medium 50. The silicon-on-insulator wafer also includes a layer of silica positioned on a silicon substrate. The layer of silica can serve as the second optical insulator 58 and the silicon substrate can serve as the substrate 60.

The dashed line in FIG. 2A, FIG. 2B, and FIG. 2D illustrates an interface between the light-transmitting medium 42 and the component medium 50. The light-transmitting medium 42 and the component medium 50 can be the same material or different materials. When the light-transmitting medium 42 and the component medium 50 are the same material, the interface between the light-transmitting medium 42 and the component medium 50 may not be readily apparent. Additionally, the waveguide layer 40 can be bonded to the device platform 41. As a result, the light-transmitting medium 42 can be bonded to the optical insulator 48 that is located over the inactive portions 54 of the component medium 50. Additionally, the light-transmitting medium 42 can be bonded to the component medium 50 at the interface. Although the light-transmitting medium 42 and the component medium 50 can be the same material, when the light-transmitting medium 42 and the component medium 50 are crystalline materials the lattice for the light-transmitting medium 42 can be discontinuous with the lattice for the component medium 50 at the interface of the component medium 50 and the light-transmitting medium 42. For instance, bonding technologies can result in the component medium 50 having a lattice structure that is not continuous with the lattice structure of the light-transmitting medium 42. In contrast, growth technologies such as epitaxial growth would produce lattices that are continuous at the interface. The lattice discontinuity can be evident from lattice mismatch and/or lattices that are not aligned with one another even when the lattices are the same and have the same lattice spacing. Discontinuity can be evident from a layer of other material between the lattices. For instance, oxygen may be present at the interface in the form of an oxide of the light-transmitting medium 42 and/or of the component medium 50 in a higher concentration than it is present in the bulk light-transmitting medium 42 and/or of the component medium 50. Alternately, the oxygen may be present in a layer that is a result of an attachment or bonding process.

Figure 2E:
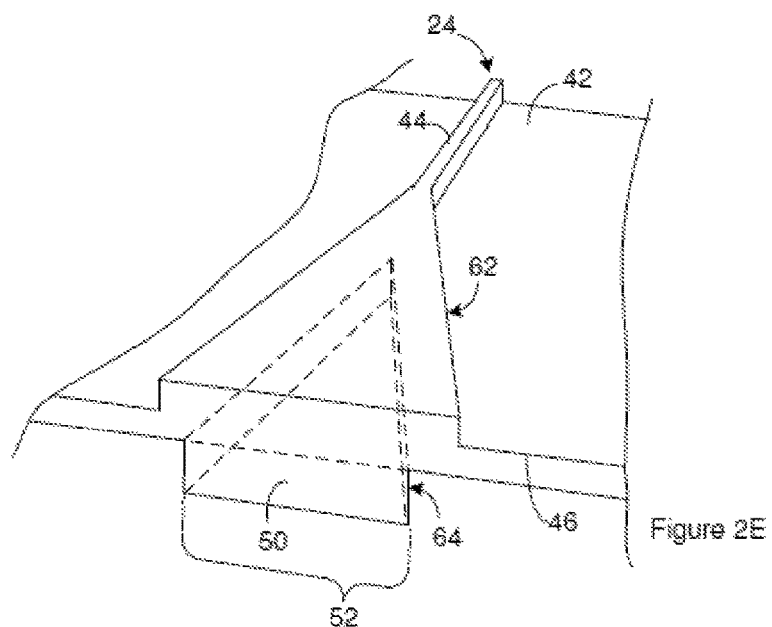
FIG. 2E shows a taper and a waveguide separated from the other components on the device shown in FIG. 2A and FIG. 2D.

A portion of the ridge of light-transmitting medium 42 is tapered. The tapered portion of the ridge and the active portion 52 of the component medium 50 combine to form a taper that is suitable for serving as the taper 20 of FIG. 1. As discussed above, FIG. 2D treats the waveguide layer 40 as transparent. As a result, the interior features of the waveguide taper 20 are shown in FIG. 2D. FIG. 2E shows the taper 20 and waveguide 24 separated from the other components on the device.

The taper 20 includes multiple taper structures. The illustrated taper 20 includes a waveguide taper 62 and a platform taper 64 that combine to form the taper although the taper can include a different number of taper structures. The waveguide taper 62 and the platform taper 64 can have one or two features selected from a group consisting of a horizontal taper and a lateral taper. As a result, the taper can be horizontally and/or vertically tapered. The illustrated waveguide taper 62 has a horizontal taper but does not have a vertical taper. The illustrated platform taper 64 has a horizontal taper but does not have a vertical taper. The tapers in different taper structures can be different as is most evident from FIG. 2D. For instance, FIG. 2D shows the platform taper having a faster taper rate than the waveguide taper 62. Additional examples of taper differences that can be evident in adjacent taper structures include, but are not limited to, different shapes such as straight and curved. The different taper structures in a taper can be constructed such that the combination of taper structures provided the taper with one or more features that are not present in any of the individual taper structures. For instance, the taper structures shown in FIG. 2A through FIG. 2E are constructed such that the taper has a vertical taper even though none of the taper structures is vertically tapered. In some instances, the taper structures are selected so as to provide the taper with an adiabatic taper.

The light-transmitting medium 42 included in the waveguide taper 62 includes an upper facet surface and the component medium 50 included in the platform taper 64 includes a lower facet surface. The upper facet surface and the lower facet surface combine to form the taper facet 28.

The taper structures are selected to provide a taper facet 28 that is suitably sized for alignment with the core 16 of the optical fiber.

FIG. 2D shows the platform taper 64 positioned within the footprint of the waveguide taper 62. In this arrangement, the taper is butt-coupled with the waveguide 24 rather having one or more taper structures that push the lights signal into the waveguide from above or below the waveguide 24. Butt coupling between the taper and the waveguide 24 provides a more efficient transfer of optical energy between the taper and the waveguide 24. However, the taper can have other structures. For instance, the platform taper 64 can extend past the waveguide taper 62 and under the waveguide 24.

As is most evident from FIG. 2C and FIG. 2D, third optical insulators 66 can be located on the lateral sides of the platform taper 64 and on the lateral sides of the inactive portions 54 of the component medium 50. The third optical insulators 66 and the second optical insulator 58 can act as a cladding for the platform taper 64. For instance, the second optical insulator 58 and the third optical insulators 66 can be configured to reflect light signals from the platform taper 64 back into the platform taper 64 in order to constrain light signals in the platform taper 64. For instance, third optical insulators 66 and the second optical insulator 58 can contact the component medium 50 in the platform taper 64 and can each have a lower index of refraction than the component medium 50. The drop in the index of refraction can cause reflection of a light signal from the component medium 50 back into the component medium 50. In some instances, the third optical insulators 66 and the second optical insulator 58 are the same material. In one example, the third optical insulators 66 and the second optical insulator 58 are each silica and the component medium 50 is silicon.

The optical insulator 48, second optical insulator 58, and third optical insulator 66 are located in a secondary recess 68 in the component medium 50. The optical insulator 48, second optical insulator 58, and third optical insulator 66 can define a recess 70 within the secondary recess 68. A recess medium 72 can be positioned in the recess 70. As is most evident from FIG. 2D, the contents of the secondary recess 68 can contact the waveguide taper 62 or light-transmitting medium 42. The portion of the recess contents that contact the waveguide taper 62 preferably has an index of refraction that is lower than the index of refraction of the light-transmitting medium 42 and/or waveguide taper 62 in order to constrain light within the light-transmitting medium 42. In the illustrated device, the recess 70 is open to the atmosphere in which the device is positioned. As a result, the atmosphere in which the device is positioned is also in the secondary recess 68 or the recess 70. Accordingly, the secondary recess 68 can enclose a fluid such as air. For instance, the recess medium 72 can be a fluid such as air. Alternately, the secondary recess 68 can be filled with a solid. For instance, the optical insulator 48, second optical insulator 58, or third optical insulator 66 can fill the recess. Alternately, two or three components selected from a group consisting of the optical insulator 48, second optical insulator 58, and third optical insulator 66 can fill the secondary recess 68. Additionally or alternately, in order to fill the secondary recess 68 with a solid, a solid recess medium 72 can be added to the secondary recess 68 in addition to one, two, or three components selected from the group consisting of the optical insulator 48, second optical insulator 58, and third optical insulator 66.

Figure 3A:
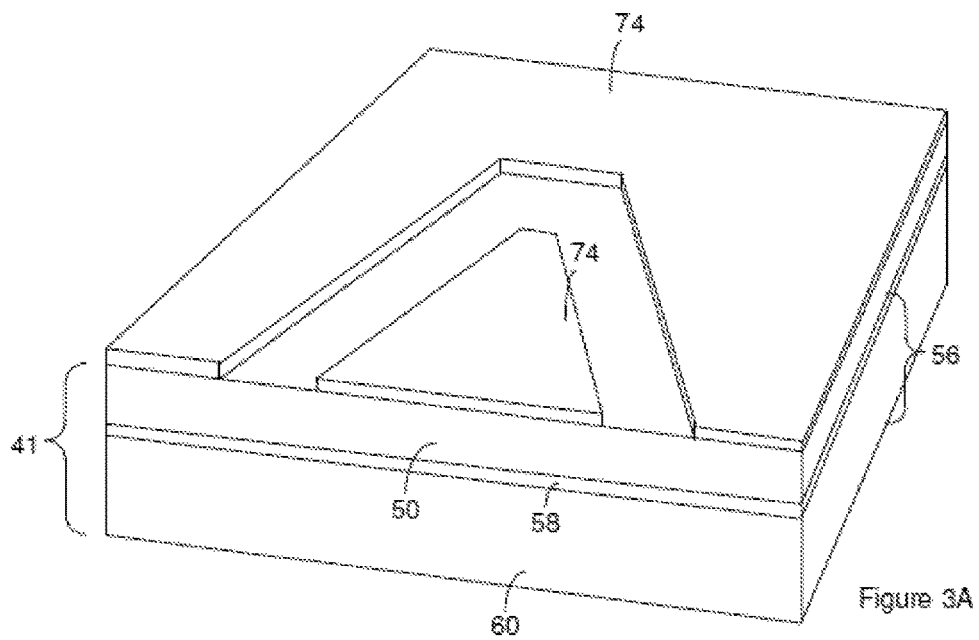
FIG. 3A through FIG. 3I illustrate a method of forming an optical device having an integrated taper according to FIG. 1A through FIG. 2E.

FIG. 3A through FIG. 3I illustrate a method of forming an optical device having an integrated taper according to FIG. 1A through FIG. 2E. FIG. 3A is a perspective view of a device precursor where the platform taper 64 will be fabricated. The device precursor will become the device platform 41. The illustrated device precursor includes a second optical insulator 58 between a substrate 60 and a component medium 50. In some instances, the second optical insulator 58, substrate 60 and component medium 50 are different portions of a silicon-on-insulator wafer or chip. A first mask 74 is formed on the component medium 50. The first mask 74 is patterned so the first mask 74 protects the regions of the device precursor where the active portion 52 of the component medium 50, the inactive portion 54 of the component medium 50, the third optical insulator 66 and the second optical insulator 58 will be located. Accordingly, the first mask 74 is patterned such that the portion of the device precursor where the recess 70 is to be formed is exposed. As will become evident below, the portion of the first mask 74 over the active portion 52 of the component medium 50 will define the platform taper 64. Accordingly, the first mask 74 is patterned so as to provide the platform taper 64 with the desired geometry. A suitable first mask 74 includes, but is not limited to, a hard mask such as silica, SiN, and polymers, silicon oxynitride, Ti, w, and Cr. A suitable method of forming the first mask 74 includes, but is not limited to, wet chemical etching and plasma etching.

Figure 3B:
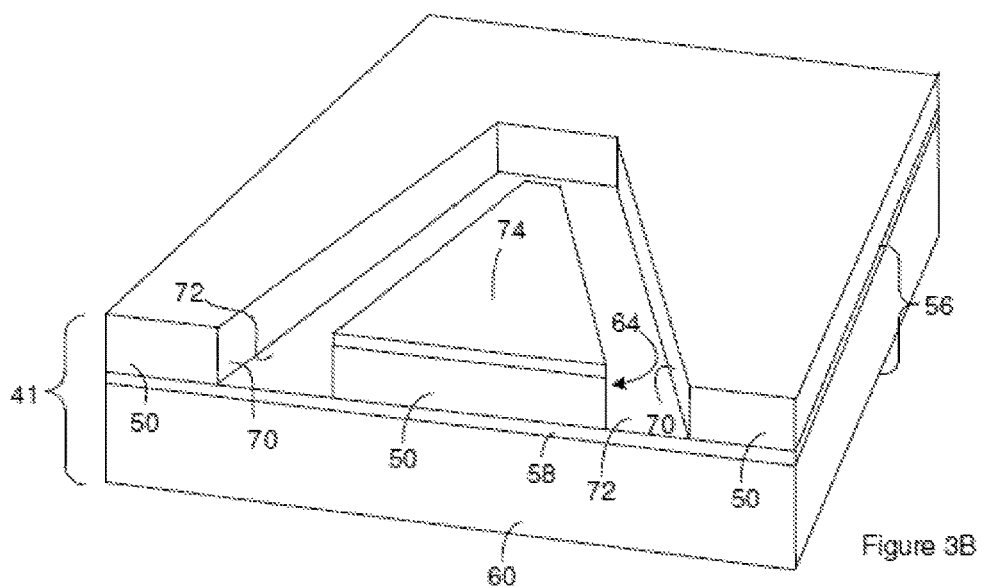

The component medium 50 is removed from the region of the device precursor so as to form the recess 70. For instance, a first etch is performed on the device precursor of FIG. 3A so as provide the device precursor of FIG. 3B. The first etch can optionally be performed for a duration sufficient to remove the exposed component medium 50 down to the second optical insulator 58. Accordingly, the first etch can expose a portion of the second optical insulator 58. Additionally, FIG. 3B illustrates a portion of the first mask 74 removed from the device precursor. For instance, the portion of the first mask 74 protecting the inactive region of the component medium 50 is removed while the portion of the first mask 74 protecting the active region of the component medium 50 remains in place. A suitable method for removing the portion of the first mask 74 includes, but is not limited to, an anisotropic etch such as reactive ion etching (RIE), a plasma etch, and a wet chemical etch.

Figure 3C:
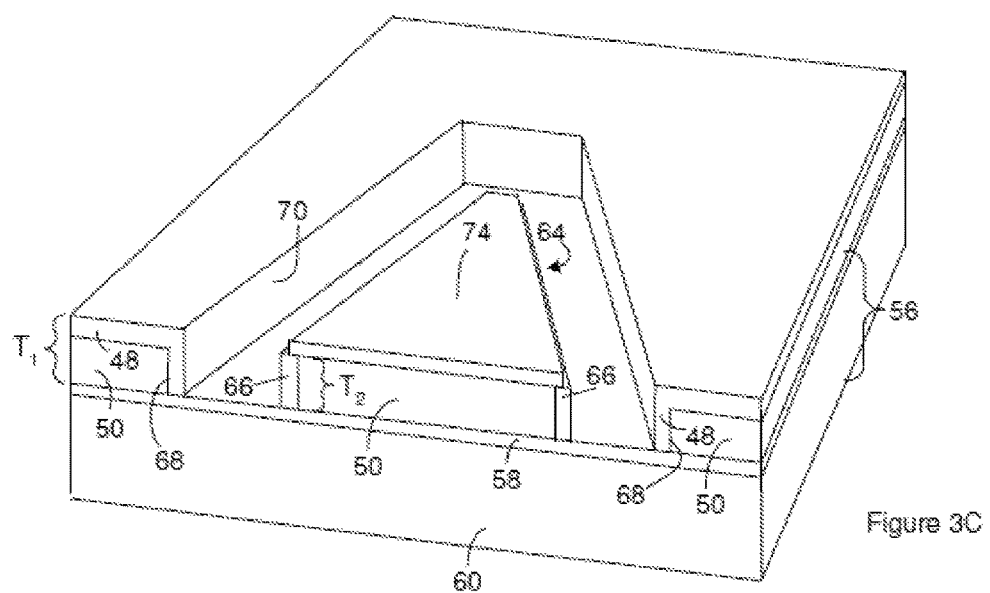

The optical insulator 48 and the third optical insulator 66 are formed on the device precursor of FIG. 3B so as to form the device precursor of FIG. 3C. For instance, an oxide, such as an oxide of the component medium 50, can serve as the optical insulator 48 and/or the third optical insulator 66 and the oxide can be formed on the device precursor of FIG. 3B so as to form the device precursor of FIG. 3C. The oxide can be formed through a process such as a thermal oxide process where the device precursor is heated in the presence of oxygen. When the component medium 50 is silicon and a thermal oxide process is performed, exposed silicon reacts with oxygen to form silicon dioxide that can act as the 48 optical insulator and the third optical insulator 66. Since the resulting oxide occupies more volume than the component medium 50 that was converted to the oxide, FIG. 3C shows the third optical insulator 66 extending beyond the perimeter of the first mask 74.

Additionally, oxide does not form between the first mask 74 and the component medium 50. As a result, the top of the component medium 50 located under the first mask 74 is not converted to oxide. Accordingly, the top of the active portion 52 of the component medium 50 is not converted to oxide while the top of the inactive portion 54 of the component medium 50 is converted to oxide. As a result, the active portion 52 of the component medium 50 is thicker than the inactive portion 54 of the component medium 50. As noted above, the oxide resulting form the thermal oxide process occupies more volume than the component medium 50 that was converted to the oxide. As a result, the combined thickness of the oxide and the inactive portion 54 of the component medium 50 (labeled $T_1$ in FIG. 3C) is thicker than the active portion 52 of the component medium 50 (labeled $T_2$ in FIG. 3C). The thickness imbalance ($T_1$ versus $T_2$) is addressed by palanarizing the top of the device precursor. For instance, the first mask 74 can be removed from the device precursor of FIG. 3C and the result planarized so as to form the device precursor of FIG. 3D. As will become evident below, the device precursor of FIG. 3D will serve as the device platform 41. Accordingly, the oxide that remains after the planarization serves as the optical insulator 48 and the third optical insulator 66 and the active portion 52 of the component medium 50 will serve as the platform taper 64. As will become evident below, the device precursor of FIG. 3D will serve as the device platform 41. Suitable methods for planarizing the device precursor include, but are not limited to, chemical-mechanical polishing (CMP), grinding, and etch back.

Figure 3D:
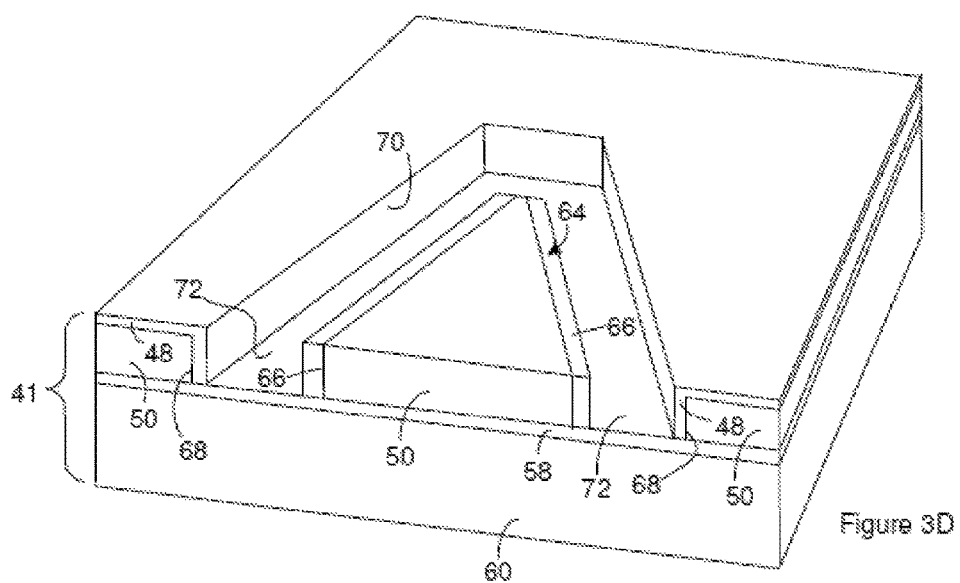
Figure 3E:
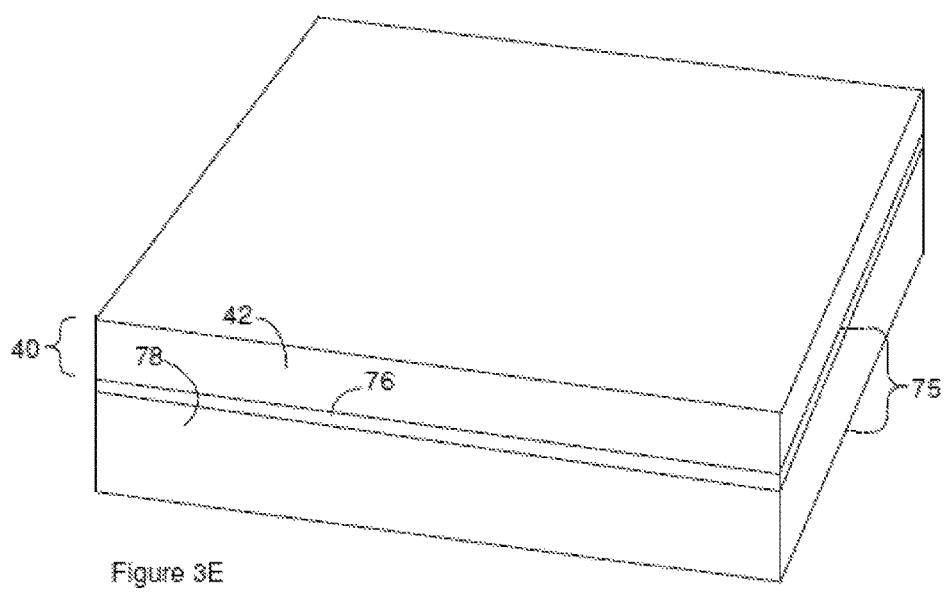

FIG. 3E illustrates a waveguide layer precursor that will serve as the source of the waveguide layer 40. The waveguide layer precursor can be the same type of chip or wafer as the device precursor. As an example, the waveguide layer precursor and the device precursor can both be silicon-on-insulator wafers or silicon-on-insulator chips. The illustrated waveguide layer precursor includes the light-transmitting medium 42 on a base 75. The base includes a fourth optical insulator 76 on a substrate 78 and the light-transmitting medium 42 or waveguide layer 40 although the waveguide layer precursor can have other structures. When a silicon-on-insulator wafer or chip serves as the waveguide layer precursor, the light-transmitting medium 42 can be silicon, the fourth optical insulator 76 can be silica and the substrate 78 can be silicon.

Figure 3F:
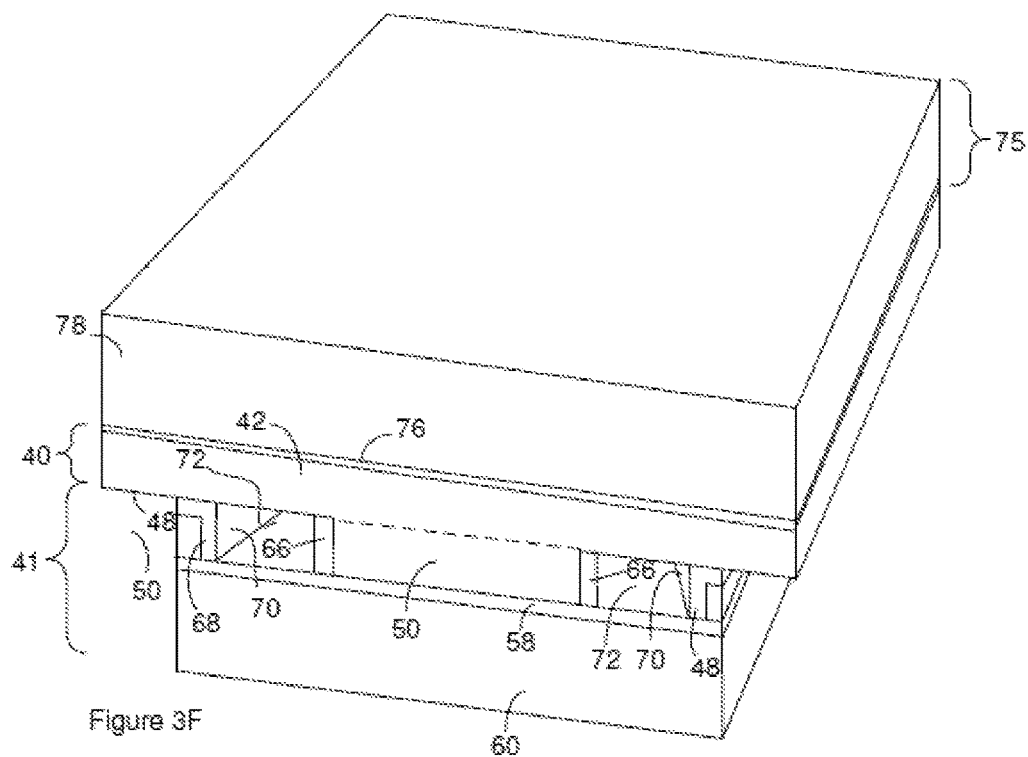

The waveguide layer precursor of FIG. 3E is inverted and bonded to the upper surface of the device precursor of FIG. 3D so as to provide the device precursor of FIG. 3F. The light-transmitting medium 42 is bonded to the top of the active portion 52 of the component medium 50 and to the top of the optical insulator 48. In FIG. 3F, the interface between the light-transmitting and the component medium 50 is illustrated by a dashed line. In instances where the light-transmitting and the component medium 50 are the same material, this interface may not be readily apparent and the interface is not illustrated in many of the subsequent figures. Suitable methods of bonding the waveguide layer precursor and the device precursor include, but are not limited to, direct bonding, plasma activated bonding, and surface activated bonding.

Figure 3G:
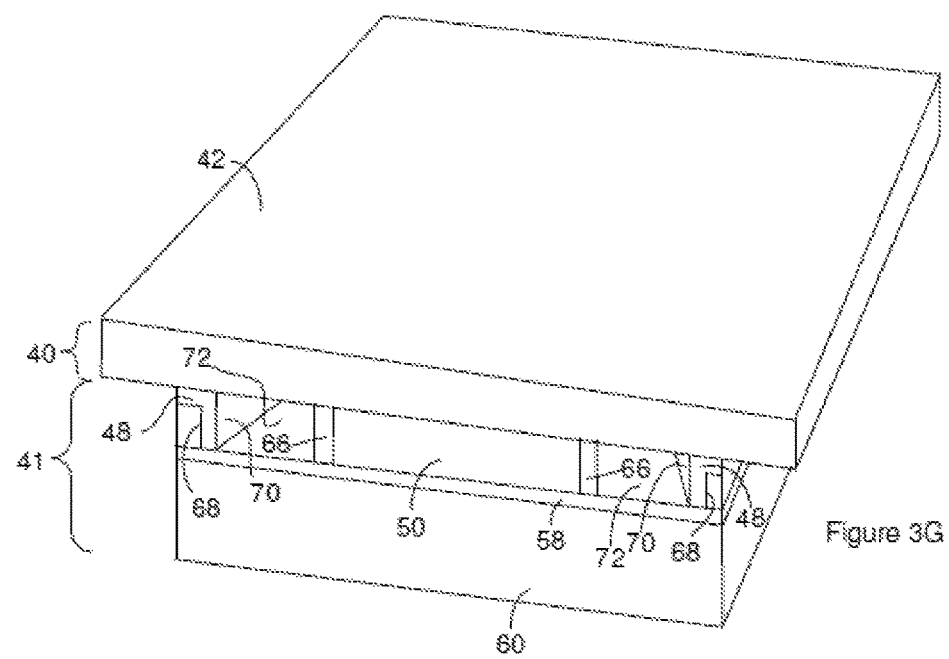
Figure 3H:
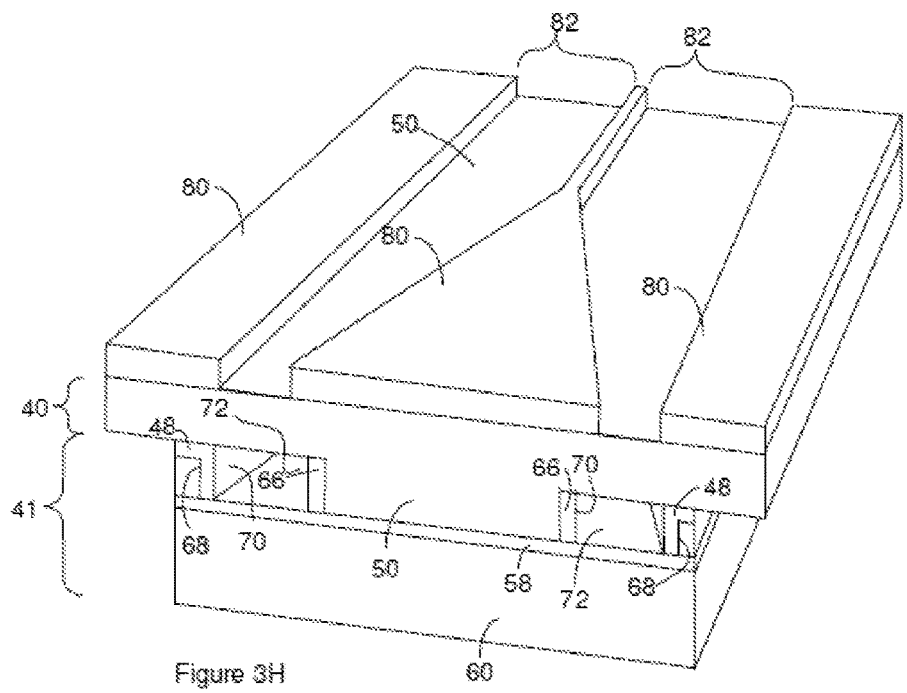

A portion of the waveguide layer precursor is removed from the waveguide layer precursor of FIG. 3F so as to leave the waveguide layer 40 on the device precursor. For instance, the substrate 78 and the fourth optical insulator 76 are removed from the waveguide layer precursor of FIG. 3F so as to provide the waveguide layer precursor of FIG. 3G. As shown in FIG. 3G, the removal of the substrate 78 and the fourth optical insulator 76 can leave a layer of the light-transmitting medium 42 on the device precursor of FIG. 3D. Suitable methods for removing the substrate 78 and the fourth optical insulator 76 include, but are not limited to, grinding, polishing, and wet chemical etching.

The flat and/or smooth upper surface of the device precursor shown in FIG. 3G makes the device precursor highly suitable for additional processing. As an example of additional processing, the waveguide 24, the waveguide taper 62, and other components can be readily formed on the device precursor of FIG. 3G. For instance, a second mask 80 can be patterned on the device precursor of FIG. 3G so as to provide the device precursor of FIG. 3H. The second mask 80 is patterned so as to protect the regions of the light-transmitting medium 42 where the ridge of the waveguide 24 and the waveguide taper 62 will be formed while leaving the adjacent regions of the light-transmitting medium 42 exposed. For instance, the second mask 80 includes trench openings 82 that extend through the second mask 80 so as to expose the light-transmitting medium 42 under the trench openings. Suitable materials for the second mask 80 include, but are not limited to, polymers, photoresists, silica, SiN, silicon, and oxynitride. Suitable methods for patterning the second mask 80 include, but are not limited to, wet chemical etches and plasma dry etches.

The light-transmitting medium 42 that is exposed in the trench openings can be removed so as to define a ridge of a waveguide 24 and the waveguide taper 62. For instance, a second etch can be performed on the device precursor of FIG. 3H and the remaining portions of the second mask 80 removed so as to form the optical device of FIG. 3I. As is evident from FIG. 3I, the second etch forms the trenches 46 that define the waveguide 24 and the waveguide taper 62 on waveguide layer 40. As a result, the second etch can be performed for a duration that is sufficient to provide the ridge of the waveguide and the waveguide taper 62 with the desired height. A suitable second etch includes, but is not limited to, wet chemical etches and plasma dry etches.

Figure 3I:
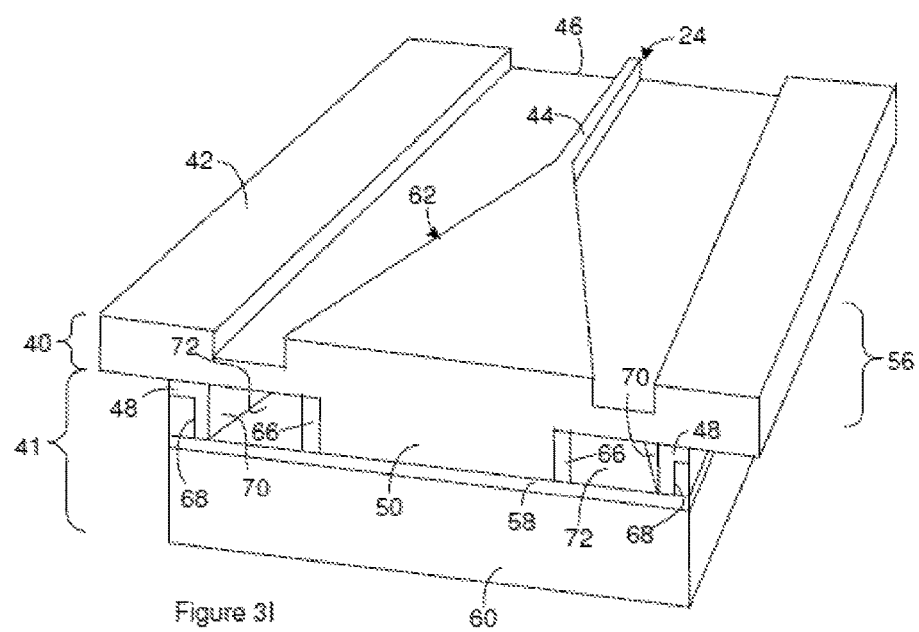

Although FIG. 3I illustrates the second mask 80 removed from the optical device, the second mask 80 can be left on the optical device for additional processing of the optical device and/or to act as a cladding.

FIG. 3F through FIG. 3I show the device platform 41 as being narrower than the waveguide layer precursor and/or than the waveguide layer 40, however, the device platform 41 can have the same width as the waveguide layer precursor and/or the waveguide layer 40 as shown in FIG. 2D. Accordingly, the lateral sides of the device platform 41 can be aligned with the lateral sides of the waveguide layer precursor and/or the waveguide layer 40.

Figure 4:
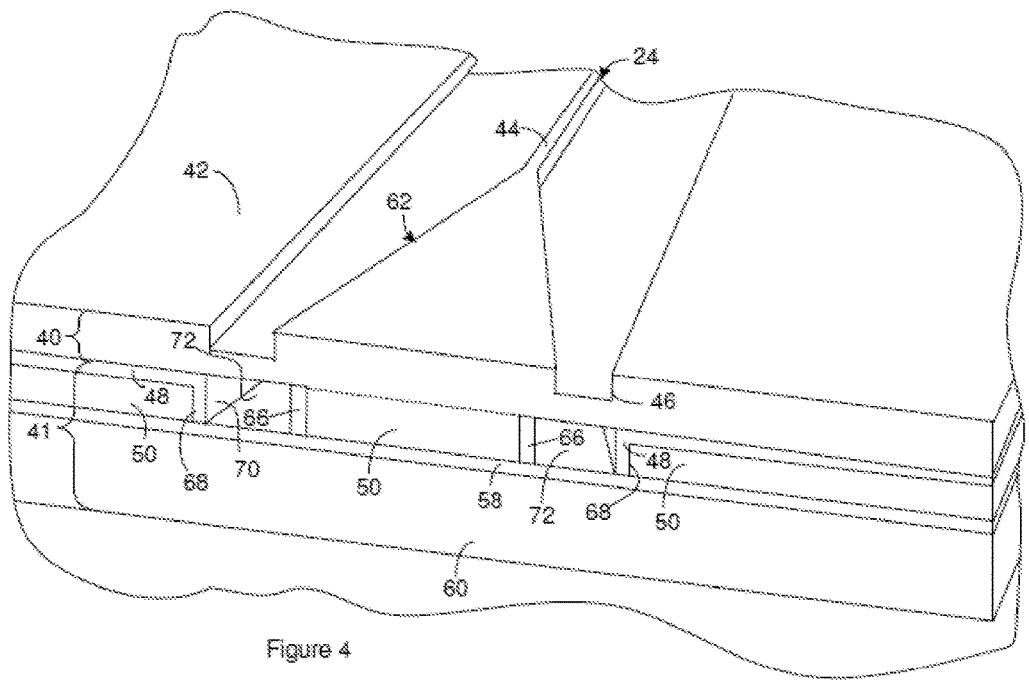
FIG. 4 is a perspective view of an optical device where a portion of the device is constructed according to FIG. 2A through FIG. 3I.

The devices illustrated in FIG. 2A through FIG. 3I can illustrate only a portion of the device. For instance, FIG. 4 is a perspective view of a larger device where a portion of the larger device is constructed according to FIG. 2A through FIG. 3I. Further, the device platform 41 can include multiple platform tapers 64 that are each aligned with a different waveguide taper 62 on the waveguide so as to provide the device with multiple different tapers that can each be aligned with a different optical fiber. Alternately, multiple different device platforms 41 can be bonded to a single waveguide layer 40. In this instance, one or more of the multiple different device platforms 41 can each include one or more platform tapers 64 that are each aligned with a waveguide taper 62 on the waveguide layer 40 so as to provide the device with multiple different tapers that can each be aligned with a different optical fiber.

Figure 5:
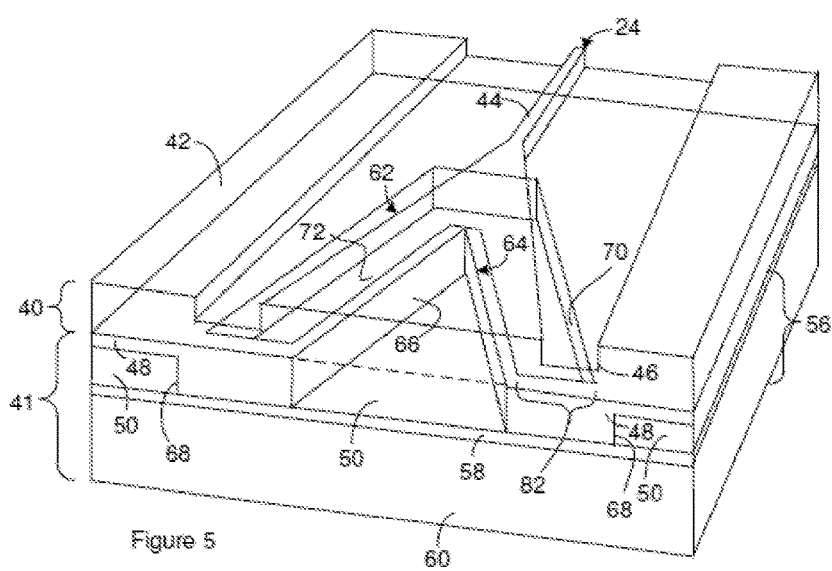
FIG. 5 is a perspective view of the optical device shown in FIG. 2D but having a recess that is sealed rather than open to the atmosphere.

Although FIG. 2A through FIG. 4 illustrate the recess 70 as being open to the atmosphere in which the device is positioned, a recess closure 84 can seal the secondary recess and/or recess 70 from the atmosphere as illustrated in FIG. 5. In the method disclosed in the context of FIG. 3A through FIG. 3I, the first mask 74 can be patterned such that the recess enclosure forms during the first etch.

The method disclosed is useful in forming optical components other than tapers. Many optical components that can be included on an optical device operate at elevated temperatures. These devices are generally more efficient when thermal insulators prevent escape of heat from the component. Since the secondary recesses 68 and/or recesses 70 discussed above can contain fluids and/or gasses such as air, these recesses can act as thermal insulators.

Figure 6A:
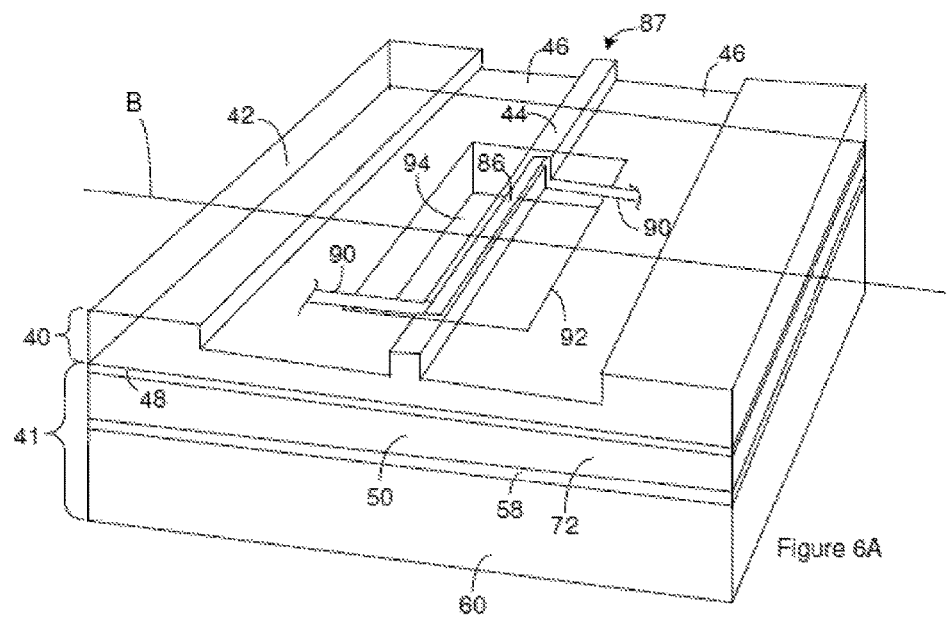
FIG. 6A is a perspective view of a portion of a device that includes a localized heater over a waveguide and that can be constructed using the method disclosed in FIG. 3A through FIG. 3I that includes a localized heater.
Figure 6B:
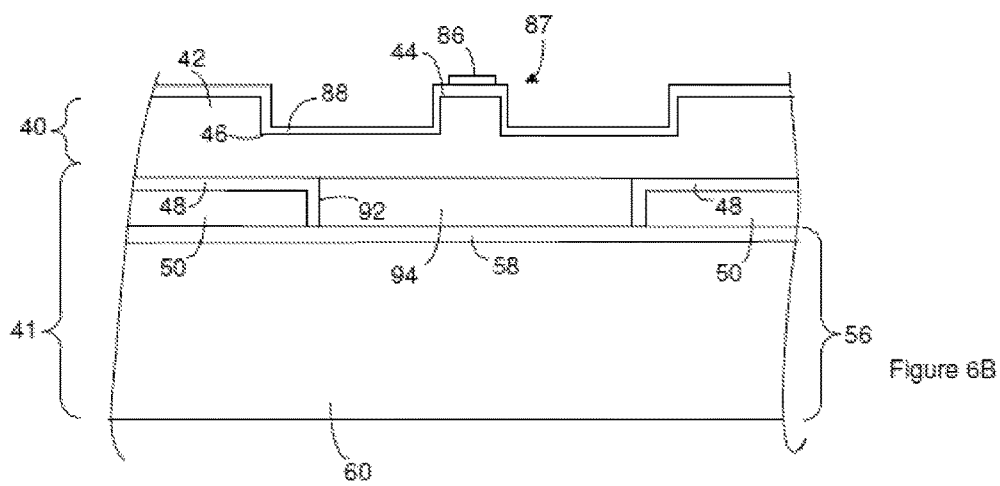
FIG. 6B is a cross section of the device shown in FIG. 6A taken along the line labeled B in FIG. 6A.

Components that include localized heaters are examples of components that can be made more efficient through the use of thermal insulators. FIG. 6A is a perspective view of a portion of a device that is constructed as disclosed above and that includes a localized heater 86. The waveguide layer 40 is treated as transparent so the underlying features are visible. FIG. 6B is a cross section of the device shown in FIG. 6A taken along the line labeled B in FIG. 6A. FIG. 6B shows a cladding 88 located over the waveguide layer 40. The cladding 88 is optional and is not shown in FIG. 6A in order to simplify FIG. 6A. The heater 86 is positioned on top of the ridge of a waveguide 87. The waveguide 87 can be a different portion of the waveguide 24 disclosed above or can be a different waveguide. The heater 86 can be a resistive heater. Electrical conductors 90 are in electrical communication with the heater 86. The electrical conductors 90 can be in electrical communication with electronics (not shown) for applying an electrical current to the heater 86 so as to elevate the temperature of the waveguide 87.

The heater 86 is positioned over the recess 92 in a top of the device platform 41. The recess 92 extends into the portion of the component medium 50 located under the heater 86. As a result, at least a portion of the heater 86 is located over the recess 92. A recess medium 94 is positioned in the recess 92. When the recess medium 94 is a thermally insulating material, the recess medium 94 slows the flow of thermal energy away from the heated portion of the waveguide 87. Suitable recess media include, but are not limited to, gasses such as air, spin-on glasses, and vacuum.

The method of FIG. 3A through FIG. 3I is easily adapted for formation of the device of FIG. 6A and FIG. 6B. For instance, the first mask 74 can be patterned on the device precursor such that the portion of the device precursor where the recess 92 is to be formed is exposed. The recess 92 can be formed and the first mask 74 can be removed from around the recess 92. The oxide can be formed on the lateral sides of the recess 92 and on the top of the component medium 50 around the recess 92 so as to form the optical insulator 48 in the desired locations. The oxide on the top of the component medium 50 can act as a cladding for the waveguide 87. The planarization disclosed in the context of FIG. 3D is optional but may provide a better bond between the device platform 41 and the waveguide layer 40. When the recess 92 is a closed recess 92 as shown in FIG. 6A, the bonding process can seal the recess medium 94 in the recess 92. The waveguide layer precursor can then be bonded to the device precursor. A portion of the waveguide layer precursor is then removed so as to expose the waveguide layer 40 on the device precursor. The waveguide 87 and/or other component features can then be formed in the waveguide layer 40 and the heater 86 and electrical conductors 90 can then be formed on the waveguide 87.

FIG. 6A shows the heater 86 on the top of the waveguide 87, however, all or a portion of the heater 86 can be on one or more lateral sides of the ridge of the waveguide 87. As examples, suitable heater constructions are disclosed in U.S. patent application Ser. No. 14/231,383, filed on Mar. 31, 2014, entitled "Temperature Control of Components on an Optical Device;" and U.S. patent application Ser. No. 15/072,154, filed on Mar. 16, 2016, entitled "Temperature Control of Components on an Optical Device;" and "Temperature Control of Components on an Optical Device;" each of which is incorporated herein in its entirety.

Figure 6C:
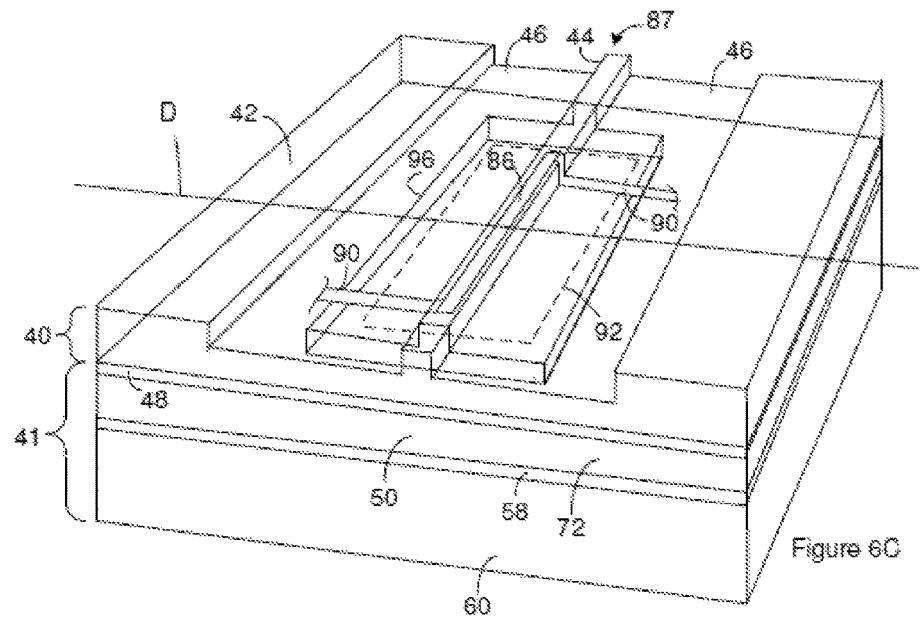
FIG. 6C and FIG. 6D show the device of FIG. 6A and FIG. 6B where the waveguide includes an active medium.
Figure 6D:
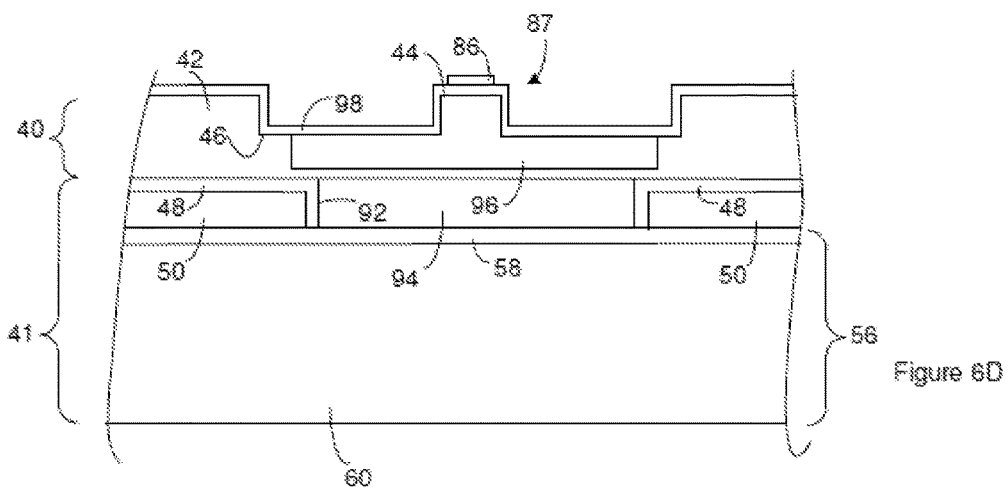

The relationship between the recess medium 94, the waveguide 87, and the heater 86 illustrated in FIG. 6A is very desirable for components such as light sensors, modulators, attenuators, optical multiplexers and/or demultiplexers, optical add/drop filters, and optical splitters and/or combiners. However, components such as light sensors and modulators can be inefficient when light is guided through a light-transmitting medium 42 such as silicon. As a result, the device can be modified so the light signals are guided through an active medium 96. For instance, FIG. 6C and FIG. 6D show the device of FIG. 6A and FIG. 6B where the waveguide 87 includes an active medium 96. FIG. 6C is a perspective view of the device. In FIG. 6C, the waveguide layer 40 is treated as transparent but the details of the recess construction are removed in order to simplify the drawing. FIG. 6D is a cross section of the device shown in FIG. 6C taken along the line labeled D in FIG. 6C.

The waveguide 87 is modified to include an active medium 96. A ridge of the active medium 96 extends upward from a slab region of the active medium 96. As a result, a light signal guided through the waveguide 87 is guided through the active medium 96. The active medium 96 provides the component with the desired functionality. For instance, the active medium 96 can be light-absorbing medium that allows the component to act as a light sensor or an electro-absorption medium that would allow the component to act as a light sensor or a modulator. Although the active medium 96 is shown extending only part way through the waveguide layer 40 or light-transmitting medium 42, the active medium 96 can extend through the waveguide layer 40 to the device platform 41 and/or through the light-transmitting medium 42 to the device platform 41.

Although not evident in FIG. 6A and FIG. 6B, FIG. 6D shows an electrical insulator 98 between the heater 86 and the ridge of the waveguide 87. The electrical insulator 98 can prevent the electrical current through the heater 86 from interfering with the operation of the optical component. The electrical insulator 98 can be the same layer as the cladding 88 shown in FIG. 6B or can be in addition to the cladding shown in FIG. 6B. Suitable electrical insulators 98 include, but are not limited to, silica, SiN, silicon oxynitride, spin-on glass and polymers.

Figure 6E:
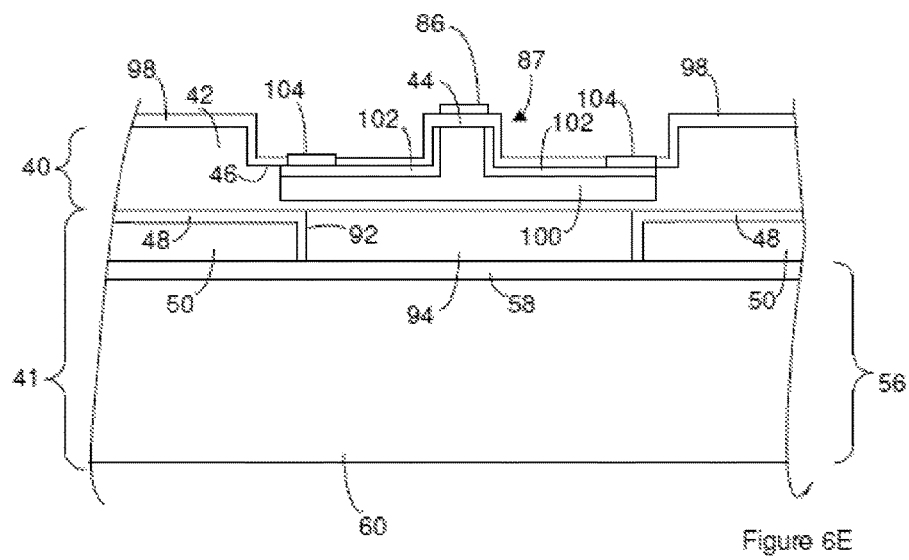
FIG. 6E illustrates the component of FIG. 6C and FIG. 6D modified with doped regions and electrical conductors so as to operate as a modulator.

The details of the doped regions and/or electrical conductors that are needed for the component on the device of FIG. 6C and FIG. 6D to operate as a light sensor and/or modulator are not illustrated in order to simplify the illustration. However, for the purposes of illustrating a fully operating component, FIG. 6E illustrates the component of FIG. 6C and FIG. 6D modified with doped regions 102 and electrical conductors so as to operate as a modulator. The modulator can be a Franz-Keldysh modulators that employs an electro-absorption medium such as $Ge_{1-x}Si_x$ (germanium-silicon) as the active medium 96. A ridge of the electro-absorption medium 100 extends upward from a slab region of the electro-absorption medium 100. The active medium 96 includes doped regions 102 doped to have different polarities (p-type versus n-type). The doped regions are located both in the slab regions of the electro-absorption medium 100 and also in the ridge of the electro-absorption medium 100. For instance, doped regions 102 of the electro-absorption medium 100 are positioned on the lateral sides of the ridge of the electro-absorption medium 100. Additionally, the doped regions 102 extend from the ridge into the slab region of the electro-absorption medium 100.

Electrical conductors 104 are positioned on the slab region of the electro-absorption medium 100. In particular, the electrical conductors 104 each contact a portion of a doped region 102 that is in the slab region of the electro-absorption medium 100. The doped regions 102 each provide electrical communication between on the electrical conductors 104 and the electro-absorption medium 100.

During operation of the modulator, electronics are employed to apply electrical energy to the electrical conductors 104 so as to form an electrical field in the electro-absorption medium 100. For instance, the electronics can form a voltage differential between the doped regions 102. The electrical field can be formed without generating a significant electrical current through the electro-absorption medium 100. The electro-absorption medium 100 can be selected such that the Franz-Keldysh effect occurs in response to the application of the electrical field. As a result, the electro-absorption medium 100 can absorb light signals received by the electro-absorption medium 100 and increasing the electrical field increases the amount of light absorbed by the electro-absorption medium 100. Accordingly, the electronics can tune the electrical field so as to tune the amount of light absorbed by the electro-absorption medium 100. As a result, the electronics can intensity modulate the electrical field in order to modulate the light signal. The presence of the heater 86 and recess medium 94 under the heater 86 are beneficial to the operation of the modulator because of reduction in heater power at low module operating temperatures providing an overall power savings.

Although the above taper is shown with two taper structures, the above method can be used to generate tapers with more than two taper structures. For instance, the steps associated with FIG. 3E through FIG. 3I can be repeated so as to form the desired number of taper structures. The waveguide need only be formed in the uppermost light-transmitting medium although waveguide(s) can optionally be formed in lower light-transmitting media.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A method of forming an optical device, comprising:
 forming a platform taper in an optical chip that includes a component medium on a base that includes a substrate, the platform taper being formed in the component medium, and
 forming the platform taper includes forming an oxide on the component medium, and
 forming the oxide on the component medium includes forming the oxide on an upper side of the platform taper and on the lateral sides of the platform taper;
 removing the oxide from the upper side of the platform taper so as to expose the upper side of the platform taper without removing all of the oxide from the lateral sides of the platform taper;
 bonding a second optical chip to the optical chip after forming the platform taper in the optical chip, the second optical chip including a light-transmitting medium;
 forming a waveguide taper in the light-transmitting medium after bonding the second optical chip to the optical chip,
 the waveguide taper and the platform taper being aligned so as to form an optical taper that includes the platform taper between the substrate and the waveguide taper.

2. The method of claim 1, wherein the optical chip is a silicon-on-insulator chip.

3. The method of claim 1, wherein bonding the second optical chip to the optical chip includes bonding the light-transmitting medium to the component medium included in the platform taper such that the light-transmitting medium is in direct contact with the component medium included in the platform taper.

4. The method of claim 3, wherein the component medium and the light-transmitting medium are both silicon.

5. The method of claim 1, wherein a waveguide is formed concurrently with forming the waveguide taper.

6. The method of claim 1, wherein a facet of the taper includes a surface of the waveguide taper aligned with a surface of the platform taper.

7. The method of claim 1, further comprising: removing a portion of the second optical chip after bonding the second optical chip to the optical chip and before forming the waveguide taper.

8. The method of claim 7, wherein the second optical chip includes one or more layers of material in addition to the light-transmitting medium and removing the portion of the second optical chip includes removing the one or more layers of material from the second optical chip.

9. The method of claim 1 wherein the oxide is formed on an upper surface of the optical chip and the second optical chip is bonded to the optical chip such that the light-transmitting medium contacts the oxide on the upper surface of the optical chip.

10. The method of claim 1, wherein the waveguide taper is formed in the light-transmitting medium after the second optical chip is bonded to the optical chip.

11. The method of claim 3, wherein a lattice of the light-transmitting medium in the waveguide taper is not continuous with a lattice of the component medium included in the platform taper.

12. A method of forming an optical device, comprising:
 forming a platform taper in an optical chip that includes a component medium on a base that includes a substrate, the platform taper being formed in the component medium, and
 forming the platform taper includes forming an oxide on the component medium, and
 forming the oxide on the component medium includes forming the oxide on an upper side of the platform taper and on the lateral sides of the platform taper;
 removing the oxide from the upper side of the platform taper so as to expose the upper side of the platform taper without removing all of the oxide from the lateral sides of the platform taper;
 bonding a second optical chip to the optical chip after forming the platform taper in the optical chip,
 the second optical chip including a light-transmitting medium, and
 the second optical chip being bonded to the optical chip such that a portion of the light-transmitting medium contacts a portion of the component medium that is included in the platform taper and another portion of the light-transmitting medium contacts the oxide formed on the component medium; and
 forming a waveguide taper in the light-transmitting medium after bonding the second optical chip to the optical chip, the waveguide taper and the platform taper being aligned so as to form an optical taper that includes the platform taper between the substrate and the waveguide taper.

13. The method of claim 12, wherein the component medium and the light-transmitting medium are both silicon.

14. The method of claim 12, wherein a facet of the taper includes a surface of the waveguide taper aligned with a surface of the platform taper.

15. The method of claim 12, further comprising: removing a portion of the second optical chip after bonding the second optical chip to the optical chip and before forming the waveguide taper.

16. The method of claim 12, wherein the oxide is formed on an upper surface of the optical chip and the second optical chip is bonded to the optical chip such that the light-transmitting medium contacts the oxide on the upper surface of the optical chip.

17. The method of claim 16, wherein the second optical chip includes one or more layers of material in addition to the light-transmitting medium and removing the portion of the second optical chip includes removing the one or more layers of material from the second optical chip.

18. The method of claim 12, wherein the waveguide taper is formed in the light-transmitting medium after the second optical chip is bonded to the optical chip.

19. The method of claim 12, wherein a lattice of the light-transmitting medium in the waveguide taper is not continuous with a lattice of the component medium included in the platform taper.

* * * * *